US007039939B1

(12) United States Patent
Millet et al.

(10) Patent No.: US 7,039,939 B1
(45) Date of Patent: May 2, 2006

(54) METHOD AND APPARATUS FOR CREATING VIRTUAL UPSTREAM CHANNELS FOR ENHANCED LOOKAHEAD CHANNEL PARAMETER TESTING

(75) Inventors: Mark E. Millet, Mountain View, CA (US); Chrisanto Leano, San Jose, CA (US); Sunil Khaunte, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/568,795

(22) Filed: May 9, 2000

(51) Int. Cl.
*H04N 7/173* (2006.01)

(52) U.S. Cl. ........................ 725/111; 725/116; 725/118; 725/120; 725/121

(58) Field of Classification Search ........ 725/124–127, 725/111, 107, 116, 118, 120, 121; 375/222; 370/329, 354–442
See application file for complete search history.

(56) References Cited

U.S. PATENT DOCUMENTS

| | | | | |
|---|---|---|---|---|
| 3,924,187 | A * | 12/1975 | Dormans | 725/125 |
| 5,142,690 | A * | 8/1992 | McMullan et al. | 725/124 |
| 5,613,190 | A * | 3/1997 | Hylton | 725/81 |
| 5,862,451 | A * | 1/1999 | Grau et al. | 725/116 |
| 6,028,860 | A * | 2/2000 | Laubach et al. | 370/395.64 |
| 6,032,019 | A * | 2/2000 | Chen et al. | 725/124 |
| 6,166,760 | A * | 12/2000 | Kay | 725/107 |
| 6,230,326 | B1 * | 5/2001 | Unger et al. | 725/111 |
| 6,370,191 | B1 * | 4/2002 | Mahant-Shetti et al. | 375/233 |
| 6,385,773 | B1 * | 5/2002 | Schwartzman et al. | 725/124 |
| 6,574,796 | B1 * | 6/2003 | Roeck et al. | 725/111 |
| 6,574,797 | B1 * | 6/2003 | Naegeli et al. | 725/120 |
| 6,594,305 | B1 * | 7/2003 | Roeck et al. | 375/222 |
| 6,598,229 | B1 * | 7/2003 | Smyth et al. | 725/107 |
| 6,618,386 | B1 * | 9/2003 | Liu et al. | 370/401 |
| 6,618,387 | B1 * | 9/2003 | Liu et al. | 370/401 |
| 6,678,893 | B1 * | 1/2004 | Jung | 725/111 |
| 6,698,022 | B1 * | 2/2004 | Wu | 725/111 |
| 6,785,292 | B1 * | 8/2004 | Vogel | 370/433 |
| 6,888,844 | B1 * | 5/2005 | Mallory et al. | 370/466 |
| 2002/0036985 | A1 * | 3/2002 | Jonas et al. | 370/235 |
| 2002/0115421 | A1 * | 8/2002 | Shahar et al. | 455/403 |

OTHER PUBLICATIONS

Chow et al, System and Process for Return Channel Spectrum Manager, Nov. 15, 2001, WO 01/86856 A2.*

* cited by examiner

*Primary Examiner*—Kieu-Oanh Bui
(74) *Attorney, Agent, or Firm*—Beyer, Weaver & Thomas, LLP.

(57) ABSTRACT

Methods, apparatus, and computer-readable media are disclosed for creating a virtual lookahead upstream receiver in a single physical upstream receiver in a CMTS, thereby avoiding having to dedicate an upstream receiver strictly for lookahead capability. A lookahead receiver is used to determine whether a potential alternative frequency is better than the frequency presently being used. A physical upstream receiver is assigned to operate under a set of operational parameters associated with a logical lookahead receiver during a particular time slot. The logical receiver receives upstream data from a selected test modem using an alternative upstream frequency. It is then determined whether the alternative upstream frequency is preferable over the frequency presently being used. If so, the physical receiver is configured to operate normally under the set of operational parameters associated with the logical receiver. At this stage, all modems in a particular group, including the selected modem, hop over to the alternative frequency. The physical receiver can be divided into any number of logical receivers.

30 Claims, 7 Drawing Sheets

METHOD AND APPARATUS FOR CREATING VIRTUAL UPSTREAM CHANNELS FOR ENHANCED LOOKAHEAD CHANNEL PARAMETER TESTING

BACKGROUND OF THE INVENTION

1. Field of the Invention

The present invention relates generally to the field of data and voice communications over a network of nodes in a cable television plant. More specifically, it relates to the transmission of signals on the upstream path to an upstream receiver in the headend using a virtual lookahead feature.

2. Discussion of Related Art

The cable TV industry has been upgrading its signal distribution and transmission infrastructure since the late 1980s. In many cable television markets, the infrastructure and topology of cable systems now include fiber optics as part of their signal transmission components. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 50 to 700 MHz. Broadcast signals were sent downstream; that is, from the head end of the cable system across the distribution nodes, over the trunk line, to feeder lines that led to the subscribers. However, the cable system did not have installed the equipment necessary for sending signals from subscribers to the head end, known as return or upstream signal transmission.

In the 1990s, cable companies began installing optical fibers between the head end of the cable system and distribution nodes (discussed in greater detail with respect to FIG. 1). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 that is needed when transmitting and receiving data using cable modems. Block 104 of FIG. 1 represents a cable modem termination system connected to a fiber node 108 by pairs of optical fibers 106. Primary functions of the CMTS include (1) receiving broadband data inputs from external sources 100 and converting the data for transmission over the cable plant (e.g., converting Ethernet or ATM broadband data to data suitable for transmission over the cable system); (2) providing appropriate Media Access Control (MAC) level packet headers for data received by the cable system, and (3) modulating and demodulating the data to and from the cable system.

Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below). Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

| Time to Transmit a Single 500 kbyte Image | |
|---|---|
| Telephone Modem (28.8 kbps) | 6–8 minutes |
| ISDN Line (64 kbps) | 1–1.5 minutes |
| Cable Modem (10 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal. Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

FIG. 2 provides a schematic block diagram illustrating the basic components of a Cable Modem Termination System (CMTS), represented by block 200. Preferably, the CMTS is a "routing" CMTS, which handles at least some routing functions. Alternatively, the CMTS may be a "bridging" CMTS, which handles only lower-level tasks. In a specific embodiment as shown, for example, in FIG. 2, the CMTS implements three network layers, including a physical layer 232, a Medial Access Control (MAC) layer 230, and a network layer 234. When a modem sends a packet of information (e.g. data packet, voice packet, etc.) to the CMTS, the packet is received at fiber node 210 (component 108 of FIG. 1). Each fiber node 210 can generally service about 500 subscribers, depending on bandwidth. Converter 212 converts optical signals transmitted by fiber node 210 into electrical signals that can be processed by upstream demodulator and receiver 214. The upstream demodulator and receiver 214 is part of the CMTS physical layer 232. Generally, the physical layer is responsible for receiving and transmitting RF signals on the HFC cable plant. Hardware portions of the physical layer include downstream modulator and transmitter 206 and upstream demodulator and receiver 214. The physical layer also includes device driver software 286 for driving the hardware components of the physical layer.

Once an information packet is demodulated by demodulator/receiver 214, it is then passed to MAC layer 230. A primary purpose of MAC layer 230 is to coordinate channel access of multiple cable modems sharing the same cable channel. The MAC layer 230 is also responsible for encapsulating and de-encapsulating packets within a MAC header according to the DOCSIS standard for transmission of data or other information. The MAC headers include addresses to specific modems or to the CMTS (if sent upstream) by a MAC layer 230 in CMTS 200. In order for data to be transmitted effectively over a wide area network such as HFC or other broadband computer networks, a common standard for data transmission is typically adopted by network providers. A commonly used and well known standard for transmission of data or other information over HFC networks is DOSCIS. The DOCSIS standard has been publicly presented by Cable Television Laboratories, Inc. (Louisville, Colo.) in document control number SP-RFIv1.1-102-990731, Jul. 31, 1999. That document is incorporated herein by reference for all purposes.

MAC layer 230 includes a MAC hardware portion 204 and a MAC software portion 284, which function together to encapsulate information packets with the appropriate MAC address of the cable modem(s) on the system. Note that there are MAC addresses in the cable modems which encapsulates data or other information to be sent upstream with a header containing the MAC address of the CMTS associated with the particular cable modem sending the data.

In specific CMTS configurations, the hardware portions of physical layer 232 and MAC layer 230 reside on a physical line card 220 within the CMTS. The CMTS may include a plurality of distinct line cards which service particular cable modems in the network. Each line card may be configured to have its own unique hardware portions of the physical layer 232 and MAC layer 230.

Each cable modem on the system has its own MAC address. Whenever a new cable modem is installed, its address is registered with MAC layer 230. The MAC address is important for distinguishing data sent from individual cable modems to the CMTS. Since all modems on a particular channel share a common upstream path, the CMTS 200 uses the MAC address to identify and communicate with a particular modem on a selected upstream channel. Thus, data packets, regardless of format, are mapped to a particular MAC address. MAC layer 230 is also responsible for sending out polling messages as part of the link protocol between the CMTS and each of the cable modems on a particular channel. These polling messages are important for maintaining a communication connection between the CMTS and the cable modems.

After the upstream information has been processed by MAC layer 230, it is then passed to network layer 234. Network layer 234 includes switching software 282 for causing the upstream information packet to be switched to an appropriate data network interface on data network interface 202.

When a packet is received at the data network interface 202 from an external source, the switching software within network layer 234 passes the packet to MAC layer 230. MAC block 204 transmits information via a one-way communication medium to a downstream modulator and transmitter 206. Downstream modulator and transmitter 206 takes the data (or other information) in a packet structure and modulates it on the downstream carrier using, for example, QAM 64 modulation (other methods of modulation can be used such as CDMA {Code Division Multiple Access} OFDM {Orthogonal Frequency Division Multiplexing}, FSK {FREQ Shift Keying}). The return data is likewise modulated using, for example, QAM 16 or QSPK. These modulations methods are well-known in the art.

Downstream Modulator and Transmitter 206 converts the digital packets to modulated downstream RF frames, such as, for example, MPEG or ATM frames. Data from other services (e.g. television) is added at a combiner 207. Converter 208 converts the modulated RF electrical signals to optical signals that can be received and transmitted by a Fiber Node 210 to the CMTS.

It is to be noted that alternate embodiments of the CMTS (not shown) may not include network layer 234. In such embodiments, a CMTS device may include only a physical layer and a MAC layer, which are responsible for modifying a packet according to the appropriate standard for transmission of information over a cable modem network. The network layer 234 of these alternate embodiments of CMTS devices may be included, for example, as part of a conventional router for a packet-switched network.

In a specific embodiment, the network layer of the CMTS is configured as a cable line card coupled to a standard router that includes the physical layer 232 and MAC layer 230. Using this type of configuration, the CMTS is able to send and/or receive IP packets to and from the data network interface 202 using switching software block 282. The data network interface 202 is an interface component between external data sources and the cable system. The external data sources (item 100 of FIG. 1) transmit data to the data network interface 202 via, for example, optical fiber, microwave link, satellite link, or through various media. The data network interface includes hardware and software for interfacing to various networks such as, for example, Ethernet, ATM, frame relay, etc.

As shown in FIG. 2, CMTS 200 also includes a hardware block 250 which interacts with the software and other hardware portions of the various layers within the CMTS. Block 250 includes one or more processors 255 and memory 257. The memory 257 may include, for example, I/O memory (e.g. buffers), program memory, shared memory, etc. Hardware block 250 may physically reside with the other CMTS components, or may reside in a machine or other system external to the CMTS. For example, the hardware block 250 may be configured as part of a router which includes a cable line card.

Transient and Interference Noise Effecting Upstream Data Transmission

A problem common to upstream data transmission using cable systems, i.e. transmissions from the cable modem in the home back to the head end, is interference noise at the head end which lowers the signal-to-noise ratio, also referred to as carrier-to-noise ratio. Interference noise can result from numerous internal and external sources. Sources of noise internal to the cable system may include cable television network equipment, subscriber terminals (televisions, VCRs, cable modems, etc.), intermodulation signals resulting from corroded cable termini, and core connections. Significant sources of noise external to the cable system include home appliances, welding machines, automobile ignition systems, and radio broadcast, e.g. citizen band and ham radio transmissions. These ingress noise sources enter the cable system through defects in the coaxial cable line, which acts essentially as a long antenna. Ultimately, when cable systems are entirely optical fiber, ingress noise will be a far less significant problem. However, until that time, ingress noise is and will continue to be a problem with upstream transmissions.

The portion of bandwidth reserved for upstream signals is normally in the 5 to 42 MHz range. Some of this frequency band may be allocated for set-top boxes, pay-per-view, and other services provided over the cable system. Thus, a cable modem may only be entitled to some fraction (i.e., a "sub-band") such as 1.6 MHz, within a frequency range of frequencies referred to as its "allotted band slice" of the entire upstream frequency band (5 to 42 MHz). This portion of the spectrum—from 5 to 42 MHz—is particularly subject to ingress noise and other types of interference. Thus, cable systems offering two-way data services must be designed to operate given these conditions.

As noted above, ingress noise, typically narrow band, e.g., less than 100 kHz, is a general noise pattern found in cable systems. Upstream channel noise resulting from ingress noise adversely impacts upstream data transmission by reducing data throughput and interrupting service, thereby adversely affecting performance and efficient maintenance. One strategy to deal with cable modem ingress noise is to position the modem's upstream data carrier in an ingress noise gap where ingress noise is determined to be low, such as between radio transmission bands. The goal is to position data carriers to avoid already allocated areas.

Ingress noise varies with time, but tends to accumulate over the system and gathers at the head end. In addition, while a particular frequency band may have been appropriate for upstream transmissions at the beginning of a transmission, it may later be unacceptably noisy for carrying a signal. Therefore, a cable system must attempt to identify noisy frequency bands and locate optimal or better bands for upstream transmission of data at a given time.

One method of locating an area of lower noise in an upstream path involves arbitrarily selecting frequencies from a frequency list as soon as the noise for a current frequency becomes unacceptable. The frequencies may be chosen using a round robin or other selection methodology. Another method involves deploying a spectrum analyzer to locate an appropriate frequency in a single pass. The first blind "round robin" method of picking a frequency from a frequency list (also referred to as dynamic frequency agility) is slow in locating an ingress free gap since it requires going through many frequencies before a frequency with an acceptable noise level is located. It also involves changing upstream data carrier frequencies without measuring or comparing error levels of the different frequencies before choosing a particular frequency.

Implementing the other method of using a spectrum analyzer is costly and requires another hardware component in the CMTS. It involves measuring power levels (using an FFT and FIR filter) in the entire frequency spectrum using a single sweep and identifying ingress noise gaps as power minimas at the head end. Another method utilizes a "gate" that keeps the return path from an individual subscriber closed except for those times when the subscriber actually sends a return signal upstreamn. This would require knowing when the subscriber will send a return signal or any signal upstream.

Another technique of determining whether one or more upstream receiver bands is better than the band being used involves some type of "lookahead" feature. That is, it is generally desirable to be able to see ahead and then make a decision as to which band to hop to since moving a group of cable modems from one receiver band to another continuously can result in unacceptable performance on the upstream path. Moving a group of modems to another band and testing that band results in a timing penalty and, under DOCSIS, involves having to signal the downstream receiver and MAC layer, all of which takes time. For example, suppose it takes five milliseconds for a group of modems to hop to another band and another 245 milliseconds to test that new band and determine whether it is acceptable. At this rate, it takes about one second to test only four frequencies, or 30 seconds to test 120 frequencies (not an unusually high number) continuously. However, the timeout period for many modems is 30 seconds under DOCSIS at which point the connection is lost, which can include a loss of voice calls (in cases where there is voice-over-IP) and data loss. Because the noise on the upstream is chaotic, full of slow and fast transience, it is not unusual to have to hop through hundreds or thousands of frequencies before finding an acceptable receiver band.

One way for adding a lookahead feature to a CMTS is to simply add a second physical receiver in the CMTS to act as a "lookahead" receiver. This receiver can be used to determine whether other upstream receiver bands have a better carrier-to-noise ratio (or one that is above a certain threshold). However, as with the spectrum analyzer, this solution requires an additional costly hardware component in the CMTS which is generally undesirable. Furthermore, the second "lookahead" receiver cannot perform as a normal upstream receiver since it would have to be dedicated to the lookahead function. Such a receiver is available from Arris Interactive of Atlanta, Ga.

Therefore, it would be desirable to have a lookahead feature in a cable modem plant that does not require additional hardware components in the CMTS but still has the benefit of looking ahead at other bands before hopping to those bands for a group of modems. This will result in a reliable, efficient, and cost-effective method of locating upstream receiver band in an ingress or transient noise gap, thereby enabling deliberate and intelligent placement of an upstream data carrier. Furthermore, it more fully utilizes, through software, an existing and fully functioning upstream receiver without having to add more hardware components to the CMTS or anywhere else in the cable plant.

SUMMARY OF THE INVENTION

According to the present invention, methods, apparatus, and computer-readable media are disclosed for creating a virtual lookahead upstream receiver from a single physical upstream receiver in a CMTS. In one aspect of the present invention, a method of configuring a CMTS having a physical upstream receiver to perform a lookahead function for selecting an upstream frequency is described. A physical upstream receiver is assigned to operate under a set of operational parameters associated with a logical lookahead receiver. The logical receiver receives upstream data from a selected test modem using an alternative upstream frequency. It is then determined whether the alternative upstream frequency is preferable over the frequency presently being used. If so, the physical receiver is configured to operate normally under the set of operational parameters associated with the logical receiver. At this stage, all modems in a particular group, including the selected modem, hop over to the alternative frequency.

In another aspect of the present invention, a method of using a single physical upstream receiver in a headend to perform as a lookahead receiver and as a normal non-lookahead receiver is described. A test modem is selected from a group of modems using a physical upstream receiver having a presently utilized set of operational parameters. The test modem is assigned to a logical lookahead receiver having a logical set of operational parameters. A time slot is allotted to the test modem in which the test modem can transmit data upstream to the logical lookahead receiver. The upstream signal quality of an alternative frequency as used by the test modem sending data to the logical receiver is examined. The test modem is reassigned to the physical upstream receiver. If the alternative frequency is determined to be better, the normal set of operational parameters is adjusted to reflect the logical set of operational parameters.

In yet another aspect of the present invention, a physical upstream receiver in a cable modem network is configured through MAC instructions to perform as a logical lookahead receiver. This is done by assigning a special port to the logical lookahead receiver and the actual normal receiver perform as a non-lookahead receiver using a physical port. A selected modem sends data to the logical lookahead receiver during a special test time slot and having the other active modems send data to the non-lookahead receiver during another time slot. The physical upstream receiver operates normally under a regular set of operational parameters. If it is determined that the logical lookahead receiver receiving data on an alternative frequency is preferable, the operational parameters of the physical receiver are adjusted to reflect the alternative frequency and other parameters of the logical receiver.

In yet another aspect of the present invention, a computer-readable medium containing programmed instructions arranged to enable use of a single physical upstream receiver in a headend to perform as a lookahead receiver and as a normal non-lookahead receiver is described. The logical receiver receives upstream data from a selected test modem using an alternative upstream frequency. It is then determined whether the alternative upstream frequency is preferable over the frequency presently being used. If so, the physical receiver is configured to operate normally under the set of operational parameters associated with the logical receiver. At this stage, all modems in a particular group, including the selected modem, hop over to the alternative frequency.

In yet another aspect of the present invention, a computer-readable medium containing programmed instructions arranged to instruct a physical upstream receiver to perform a lookahead function for selecting an upstream frequency is disclosed. A test modem is selected from a group of modems using a physical upstream receiver having a presently utilized set of operational parameters. The test modem is assigned to a logical lookahead receiver having a logical set of operational parameters. A time slot is allotted to the test modem in which the test modem can transmit data upstream to the logical lookahead receiver. The upstream signal quality of an alternative frequency used by the test modem sending data to the logical receiver is examined. The test modem is reassigned to the physical upstream receiver. If the alternative frequency is determined to be better, the normal set of operational parameters is adjusted to reflect the logical set of operational parameters.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A typical CMTS may have several physical upstream receivers. Each one normally manages a group of modems and is used for actual communication between the modems and the CMTS. As described above, an additional receiver can be added to the CMTS to perform strictly as a lookahead receiver and, as such, cannot be fully utilized for regular data and voice communication. A lookahead receiver is desirable so that the CMTS can more accurately hop bands for a group of cable modems since changing frequencies often in this manner degrades performance of the upstream transmission in a cable network. In addition, since noise on the upstream channels is essentially chaotic, other methods for determining which band to hop to that depend on historical data may not be that useful since they assume and rely on predictable behavior.

Figure 1:
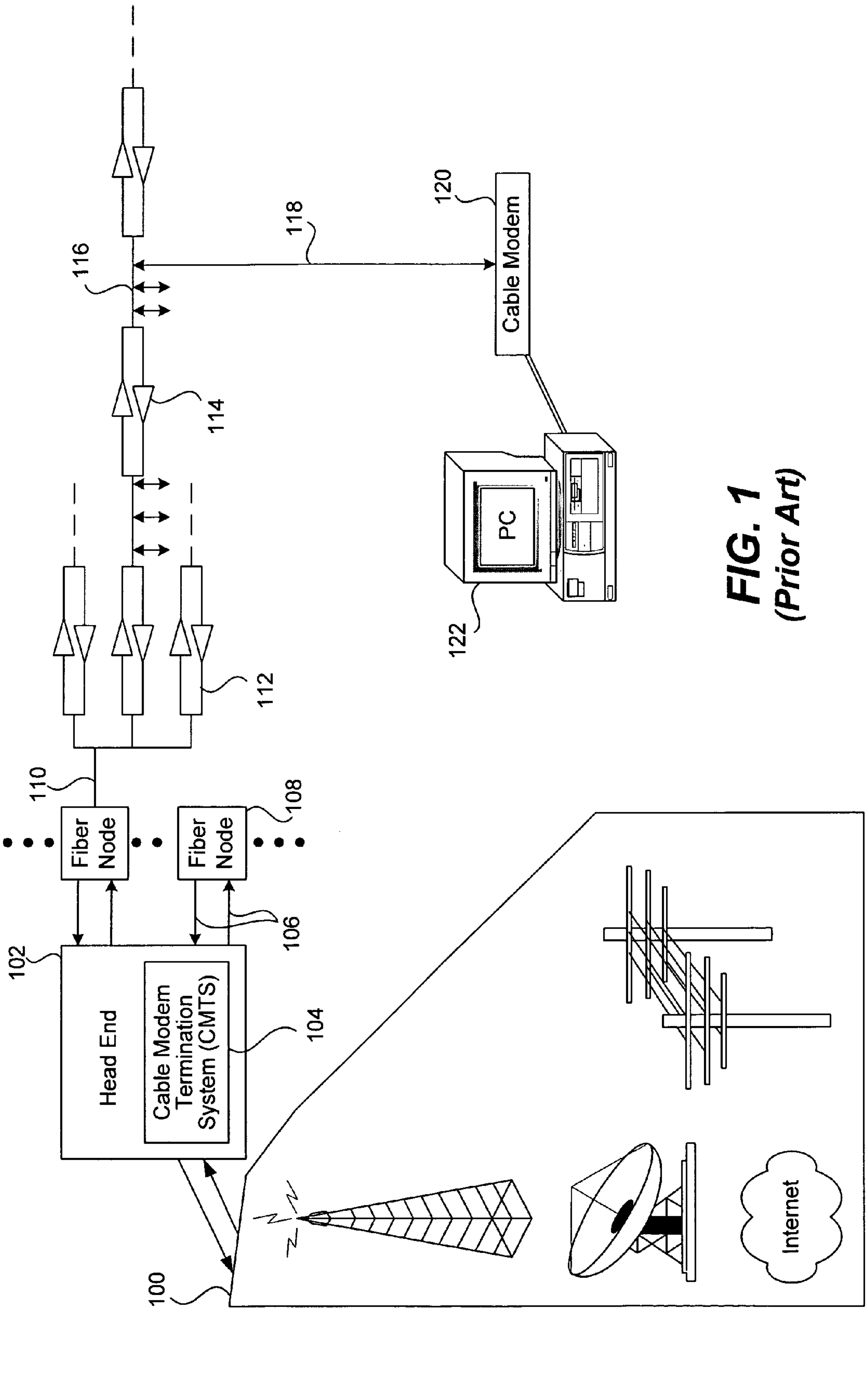
FIG. 1 (Prior Art)
FIG. 1 is a block diagram of a two-way hybrid fiber-coaxial (HFC) cable system utilizing a cable modem for data transmission.
Figure 2:
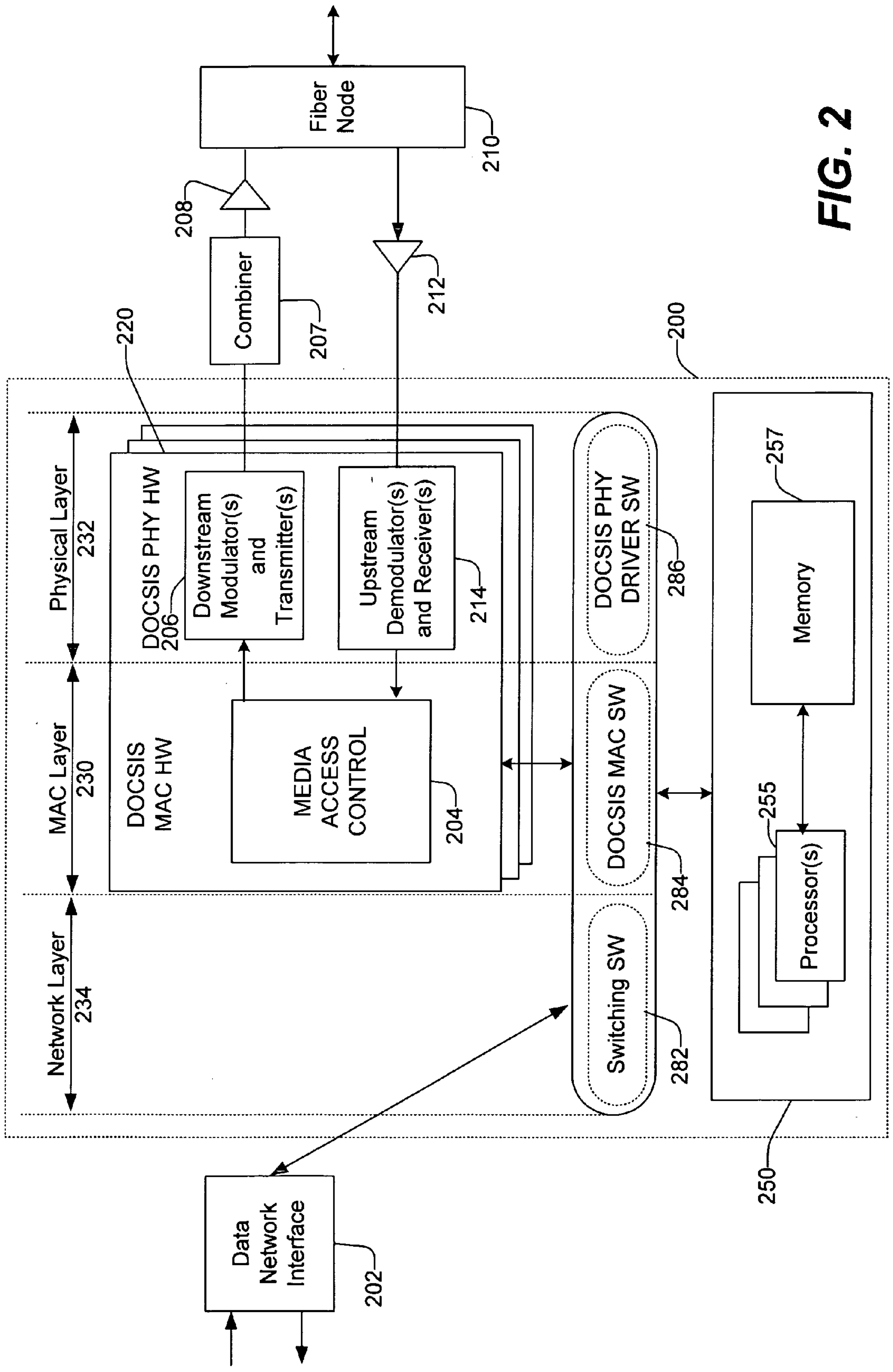
FIG. 2 provides a schematic block diagram illustrating the basic components of a Cable Modem Termination System (CMTS).
Figure 3:
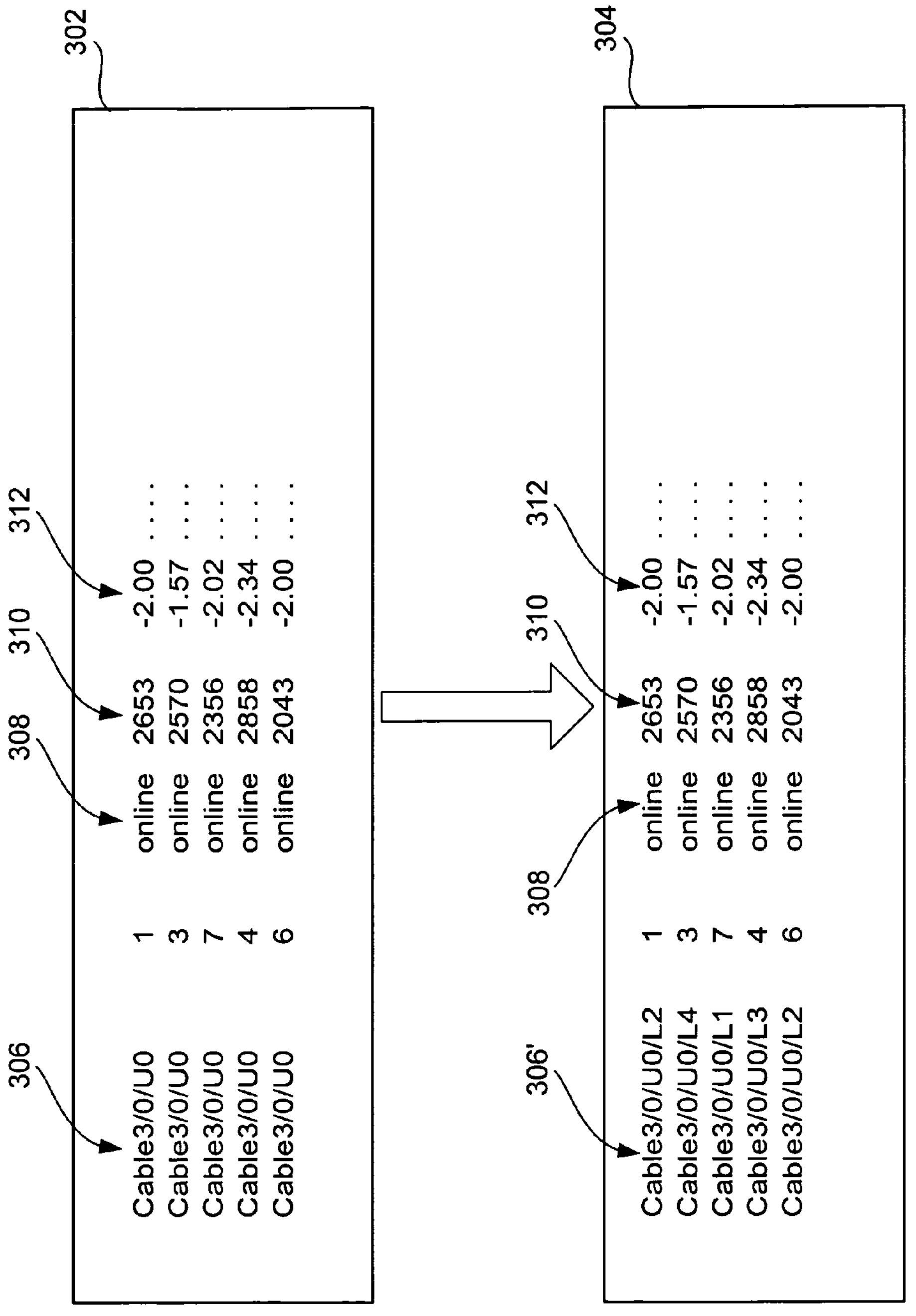
FIG. 3 shows examples of displayed lists of cable modems on a cable network that contains entries for various cable modem nodes on the network in accordance with an embodiment of this invention.

In accordance with one embodiment of the present invention, there is provided a method of having a single physical upstream receiver also perform as one or more virtual upstream lookahead receivers as described in the various figures. To further illustrate the foregoing, FIG. 3 shows examples of displayed lists of cable modems on a cable network that contain entries for various cable modem nodes on the network in accordance with an embodiment of this invention. Each node or modem has one row in each table 302 and 304. In table 302, each cable modem is shown using a single upstream receiver U0 as indicated in column 306. Typically, a CMTS will have several upstream receivers (U1, U2, etc.). For simplicity, one upstream receiver U0 is used in this example. The principles described here can be applied to any number of physical upstream receivers. Each entry of the list specifies information such as whether or not the particular cable modems are online or offline in column 308, the timing offset of the individual cable modems used for network synchronization in column 310, and the receive power level of the individual cable modems in column 312. Other information displayed but not shown are IP addresses and hexadecimal MAC addresses.

Table 304 has a modified column 306' which shows a data item for the physical upstream receiver U0 as in column 306. In addition, it shows a data item for logical or virtual upstream receivers L1 to L4. The creation and use of these logical receivers based on one physical receiver is described in the figures below. It is worth noting that the present invention describes the logical construct in a DOCSIS environment of a single physical receiver acting logically as numerous receivers, thereby allowing a virtual lookahead capability for the cable plant. The techniques of the present invention can also be used in other non-DOCSIS environments, such as wireless, twisted pair, and possibly fiber-based FDM/TDMA systems.

Each logical receiver L0 through Ln is allocated a subset of nodes or cable modems from the set of modems serviced by the physical upstream receiver U0. The upstream receiver U0 acts as only one of the logical upstream receivers at any given time. That is, from the time a modem is powered on to the time it is turned off, it uses a physical receiver U0. The logical receivers are allocated time slices from within the time interval for U0. For the purpose of illustrating the processes of the present invention, the single physical upstream receiver U0 is logically "divided" into two virtual upstream receivers L0 and L1. The concepts and processes described for two logical receivers L0 and L1 can be extended to any number of logical receivers Ln. The number of logical receivers can vary depending on the requirements of the network, while having the concepts and processes described still apply.

Figure 4:
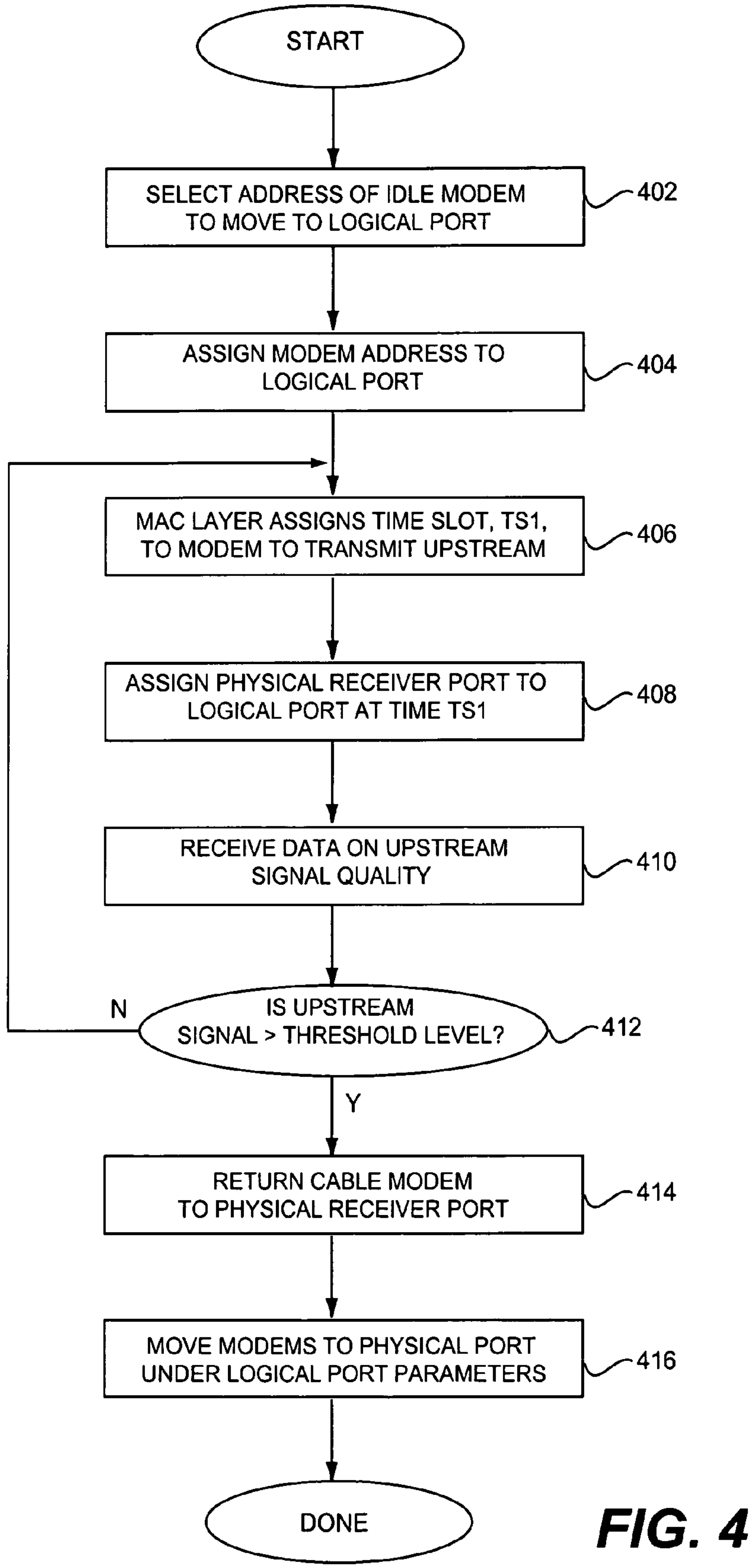
FIG. 4 is a flow diagram showing an overall process of assigning a logical port or receiver to a physical upstream receiver so that the physical receiver can operate under the parameters of the physical receiver or port in accordance with one embodiment of the present invention.

FIG. 4 is a flow diagram showing a process of assigning a logical port or receiver to a physical upstream receiver so that the physical receiver can operate under the parameters of the logical port in accordance with one embodiment of the present invention. At a step 402 a hardware address of a modem to be moved to a logical receiver or port is selected. The hardware address is typically the cable modem's MAC hardware address which is available from MAC unit in the CMTS. Each cable modem has a unique MAC address. In the described embodiment, the cable modem selected is one that is powered on but idle, i.e., not actively transporting data. In another embodiment, the modem selected need not be idle but can be any modem from the group. If an active modem is selected, the consumer may experience an occasional delay in transmitting data. The number of logical ports (L0 to Ln) is determined before this step and is based on the requirements of the cable plant. In the example used here, the physical receiver U0 has two logical ports or receivers L0 and L1. The greater the need for lookahead upstream receivers because of poor upstream signal quality and heavy data traffic, the greater the need for more logical ports.

At a step 404 the MAC hardware address is assigned to the logical port L1. In a DOCSIS environment, this can be done by issuing an upstream channel change (UCC) command and using the SID. Thus, each logical port or receiver has an actual port number in the CMTS different from the port number for the physical upstream receiver U0. At a step 406 the MAC layer assigns a time slot, TS1, to the modem selected in step 402 to transmit data upstream. In a DOCSIS environment, the cable modem is granted a time slot in which it is allowed to send data upstream. Such time slots are assigned to modems when numerous modems have to share an upstream path to transmit data. This time division multiplexing scheme is well known to a person of ordinary skill in the field of cable modem networks.

At a step 408 the physical upstream receiver U0 is assigned to be logical receiver L1 (i.e., U0 is assigned to the same parameter as logical receiver L1). The physical upstream receiver U0 is assigned to be the same as L1 at time TS1 in which the selected modem is allowed to transmit data upstream. Thus, physical receiver U0, acting as logical receiver L1, can receive data from the modem at time TS1. At a step 410 the CMTS receives some data on the upstream signal quality at upstream port L1 from data being sent by the selected modem. The modem sends data upstream to logical upstream receiver L1 in response to queries from the logical upstream controller/stub machine. Techniques for measuring the quality of the signal are well known in the field. For example, one method uses cyclical redundancy check (CRC) errors.

At a step 412 the upstream signal quality is compared to a threshold signal quality level as is commonly done in cable networks to measure the quality of an upstream band. The threshold level can be chosen by a network administrator and can vary depending on the needs of the system. If the signal quality of the upstream band being used by the selected modem is less than the threshold (i.e., its signal quality is not acceptable), control returns to step 406 where the MAC layer assigns another time slot to the selected modem and steps 408 through 412 are repeated. If the signal quality is above the threshold level and, thus, is considered an acceptable upstream band, control goes to a step 414.

At step 414 the cable modem is returned to physical port U0 using a UCD message and the logical port L1 is no longer required. That is, logical receiver L0 is assigned back to port U0 as it was before step 408. Physical receiver U0 is no longer acting as a logical upstream lookahead receiver. In theory, receiver U0 can be seen as acting as logical receiver L0 which matches the actual physical receiver. At a step 416 all the cable modems in the same group as the modem selected in step 402 (i.e., all modems sharing the same upstream band), are instructed to continue using physical receiver U0; however, they do so under the operational parameters of logical receiver L1. It is the manipulation of these operational parameters of the logical port and, in effect, merging them with the parameters of the actual physical receiver that allows for a virtual lookahead function using one physical upstream receiver. Because of the comparison performed at step 412, the cost of changing the operational parameters of U0 is considered efficient or cost-effective since it is very likely that the new band has a higher transmission quality. Therefore, it is considered worth the overhead in moving over to the logical receiver L1. The task of moving all the modems to the new band is performed by the MAC layer in the CMTS.

As will be explained in greater detail, a lookahead function has been performed via this process using a single physical upstream receiver. This process can be used in a multipoint-to-point context since idle nodes, such as cable modems, can be used to test other available upstream frequencies. Since the nodes are idle, there are no serious consequences if they are lost; that is, another band is still being used for transmitting data from active modems. After step 416 the process is complete. The process described can be executed at any time and can be performed as part of a regular maintenance check. Computer programming instructions for implementing the process described in FIG. 4 can be contained in a computer-readable medium, such as a CD-ROM or ASIC chip, to name just two examples. The instructions on the computer-readable medium can enable the upstream receiver to perform as a lookahead receiver.

Figure 5A:
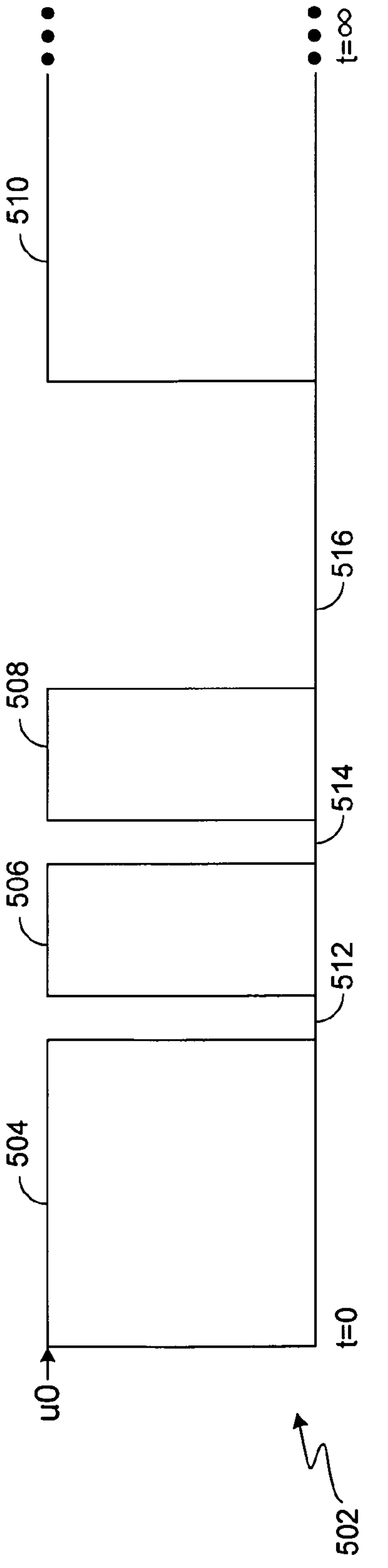
FIG. 5A is a graph representing time beginning with t=0 when a receiver is turned on to an arbitrary time (infinity) when the receiver is powered off.
Figure 5B:
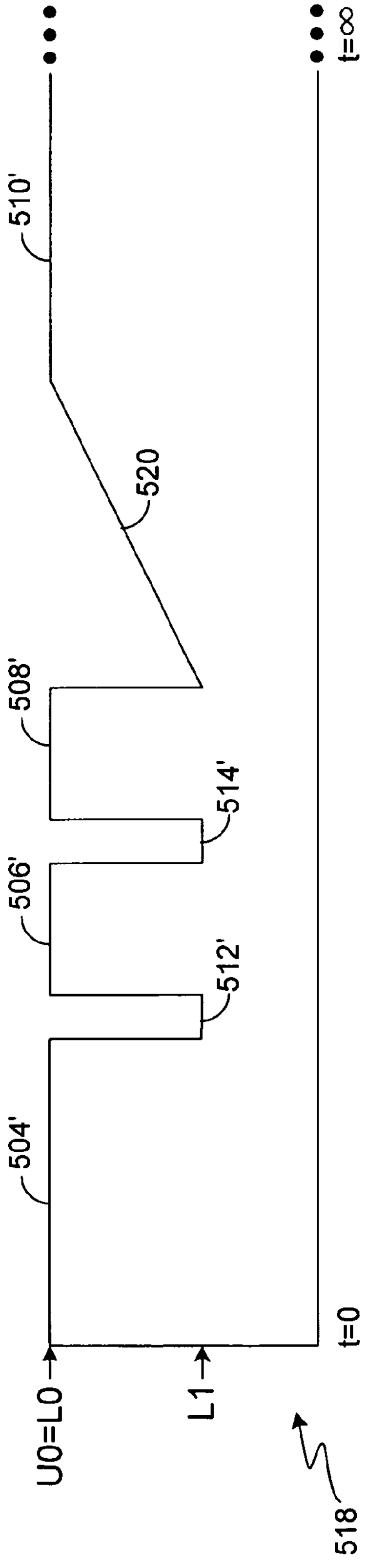
FIG. 5B is a graph showing in greater detail the sequencing of a physical upstream receiver performing as two logical receivers in accordance with one embodiment of the present invention.

FIGS. 5A and 5B are graphs plotting the functioning of physical and logical receivers against time taking into account parameter changes. At steps 408 and 416 of FIG. 4, parameters of physical and logical receivers are changed quickly or merged (such as in step 416). The graphs of FIGS. 5A and 5B show more explicitly what occurs in the physical and logical receivers when there is a shift in operating parameters. As is well known in the field of cable network operations, these parameters include center frequency, channel width (symbol rate), and modulation format (bits/symbol), such as QPSK or 16QAM in a DOCSIS environment. Graph 502 in FIG. 5A has a horizontal axis representing time beginning with t=0 when a receiver is turned on to an arbitrary time (infinity) when the receiver is powered off. A coordinate on the vertical axis represents a particular physical or logical receiver and indicates whether the receiver is operational at any given time. For example, a physical upstream receiver U0 is operational at all times represented by horizontal lines 504, 506, 508, and 510. Assuming U0 is a normally operational (i.e., a non-lookahead) upstream receiver for a group of modems or nodes on the network, a vast majority of the modems in that group can communicate with the headend during those times. Receiver U0 is operating on a particular set of parameters, referred to as para(U0) for illustrative purposes.

At time intervals represented by gaps 512, 514, and 516, physical receiver U0 is not operational either because of some type of adjustment to its parameters or because the system is idle. As described below, this adjustment can be fast and abrupt, or can take more time, such as when parameters are merging. It is worth noting that the time periods when the physical receiver cannot be utilized shown by gaps 512, 514, and 516 are not drawn to scale in FIGS. 5A and 5B.

FIG. 5B is a graph showing in greater detail the sequencing of a physical upstream receiver performing as two logical receivers in accordance with one embodiment of the present invention. Graph 518 in FIG. 5B takes graph 502 to another level of specificity by showing U0 perform as virtual receivers L0 and L1. As with graph 502, the horizontal axis represents the time a physical receiver is powered on to a time it is turned off and the vertical axis represents the operation of an upstream receiver. At time intervals 504', 506', 508', and 510', the physical receiver U0 is performing as logical receiver L0. Receiver L0 has the same operating parameters as U0 and, as such, enables a vast majority of modems from a group of cable modems to communicate with a headend. It is essentially the same as time intervals 504, 506, 508, and 510 in graph 502, except that U0 is acting as a logical receiver L0.

At time interval 512' and 514', logical receiver L0 changes its parameters, para(U0), and acts as logical receiver L1 using parameter set para(L1). The change in parameters is described in step 408 of FIG. 4 where the physical receiver port U0 is assigned to a logical port, L1. The parameter changes that take place for U0 to perform as L1 at intervals 512' and 514' occur in a time span not allowed during normal operation of the physical receiver under DOCSIS. That is, the amount of time taken to change operating parameters is illegally short. Specifically, the setup and hold times normally required are not required because the changes are not taking place on the same logical receiver. Once the parameters have been changed, a few specially selected modems that are inactive or not communicating can transmit data to logical port L1 during time intervals 512' and 514'. The transition from para(U0) to para(L1) interrupts communication between the majority of modems and the headend for a very short time. Thus, not only is the change in parameters performed quickly, but the actual time physical port U0 operates under para(L1) is also very short.

It is during times 512' and 514' when physical receiver U0 performs as a virtual lookahead receiver L1. It is during these times that the CMTS can gather data on the quality of another band in the upstream by having one or a few modems transmit data to the CMTS without effecting the transmission time for the vast majority of active modems in the group. As mentioned above, the quick change in parameters within the same physical receiver at the right time allows for uninterrupted transmission of data by the active modems in the group. The parameters para(L1) are then changed to those in para(U0) for time interval 506' and again in time interval 508'. It is during these times that the CMTS can use the transmission quality data such as the CRC data, to compute whether the alternative band used with receiver L1 is better or worse than the present band. This function is described in step 412 of FIG. 4 where the quality of the upstream signal is compared against a threshold level.

In graph 518, after compute time interval 508', during which time the majority of modems are still communicating with the headend, the physical receiver U0 enters a merge period represented by sloped line 520. Assuming that the band briefly used and examined by virtual lookahead receiver L1 in interval 514' is preferable over the present band, the parameters in para(L1) and para(U0) are merged. The time represented by line 520 is the “legal” time required to change system parameters for all devices. This is described in step 416 of FIG. 4. As a default or “normal” setting, the parameters for physical receiver U0 are set to the parameters of logical receiver L0. This is done when U0 is “assigned” to logical receiver L0 earlier in the process. With respect to implementation, no adjustment in parameters or ports is needed for this assignment, unlike the assignment to L1. Once it is determined that the operational parameters for the virtual lookahead receiver L1 are better than those of L0, a legal or permitted change of parameters occurs. All the modems in the group are switched over to the new parameters, including the new band (i.e., frequency center) of L1. Typically, during this time, none of the modems in the group can communicate with the headend. However, at this stage the transition is deemed to be efficient and worth the mass hop of all the modems in the group. The advantage is that the mass band hop is being done with the reasonable assurance that the quality of the upstream transmission will improve since a virtual “lookahead” was performed.

Figure 6:
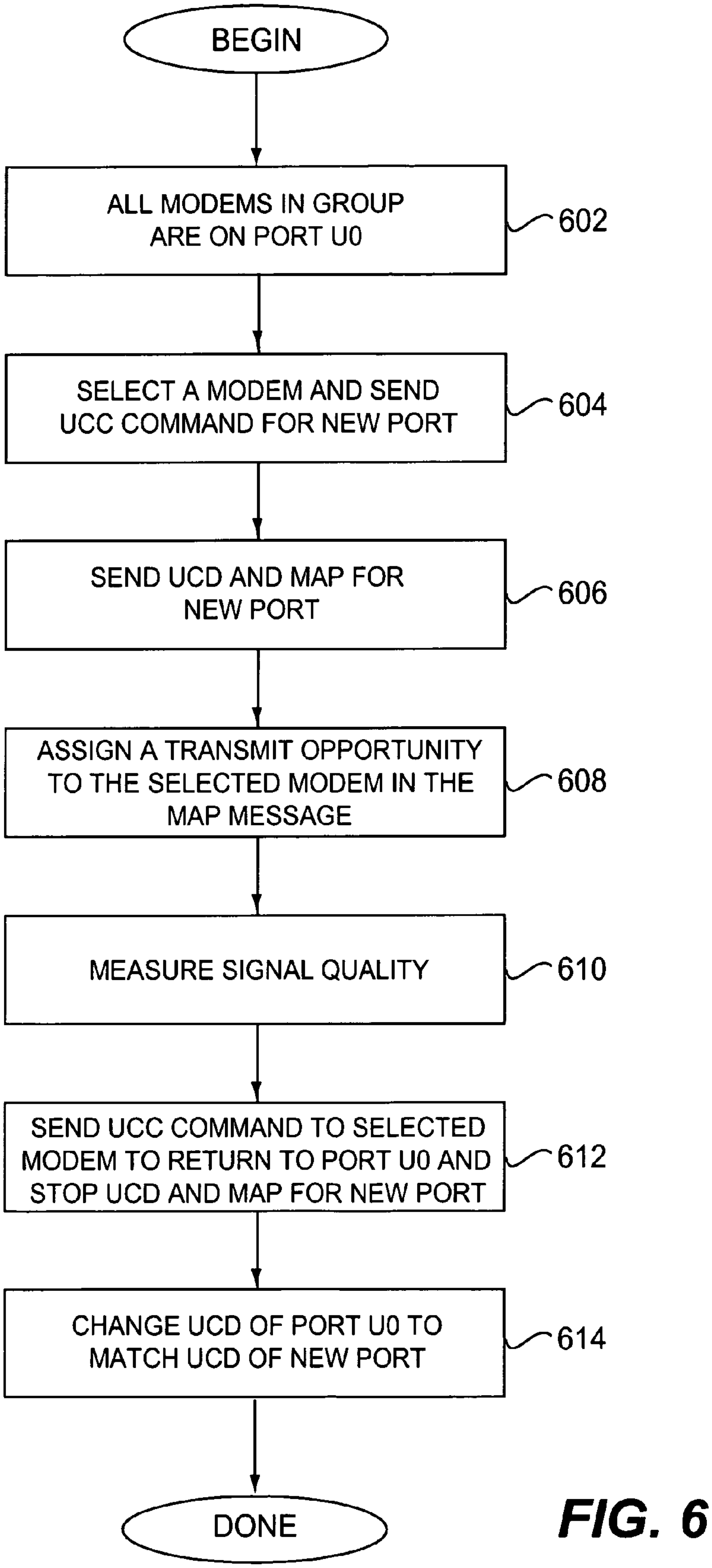
FIG. 6 is a flow diagram of a process for switching bands in accordance with one embodiment of the present invention.

FIG. 6 is a flow diagram of a process for switching bands in accordance with one embodiment of the present invention. It shows in greater detail some of the steps in FIG. 4 by describing specific MAC level messages. As will be seen, it describes a scenario in which a new port (e.g. U10) for logical receiver L1 is better than the one currently being used, U0. At a step 602, an existing condition of all modems in a group sharing the same upstream channel are on the same port, U0, and, thus, listen to the same upstream channel descriptor (UCD) message. As is known in the field, a UCD message contains parameters such as frequency center, symbol rate, and modulation scheme. Port U0 is an actual existing port that is recognized by the CMTS and modems. At a step 604 a modem is selected as is described in step 402. An upstream channel change (UCC) message is sent to the selected modem to use a new port, referred to as U10 in this example. This port can be described as a phantom port in that it exists for only a short time and is not an actual, physical port. Only the selected modem is permitted to operate on port U10.

Figure 7:
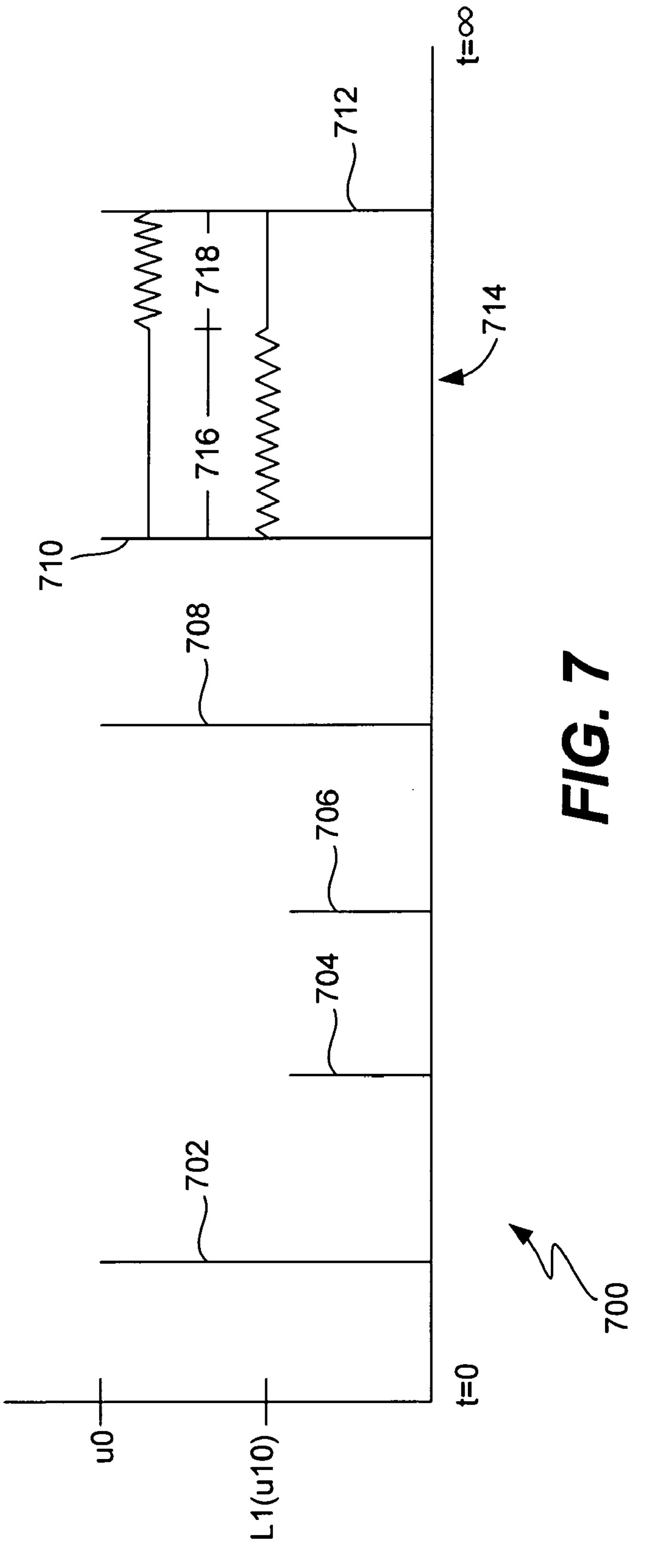
FIG. 7 is a time graph further clarifying the steps taken in FIG. 6 in accordance with one embodiment of the present invention.

To further clarify the process of FIG. 6, a time graph 700 similar to the ones shown in FIGS. 5A and 5B, is shown in FIG. 7. Line 702 represents a time at which a modem from the group of modems using port U0 is selected. In the described embodiment, the point in time in which the selection is made is essentially arbitrary. Line 704 represents a time at which the UCC message is sent to the selected modem for port U10.

Returning to FIG. 6, at a step 606 the MAC layer sends a UCD message to the selected modem for port U10 and a MAP message to both the selected modem for port U10 and to the other modems in the group using port U0. Line 706 represents sending the UCD message for U10 only. Line 708 represents the time at which a MAP message is sent to the selected modem on port U10 and also to the other modems in the group on port U0. At a step 608 the selected modem, via the MAP message, is assigned an opportunity to transmit data upstream. Similarly, the other modems sharing the same upstream are also given an opportunity to transmit data upstream. The time slot is unique in that the two logical receivers share the same physical receiver and therefore cannot overlap. This is shown in FIG. 7 by lines 716 and 718 representing the time slot described in the MAP messages sent to the modems.

At a step 610, the quality of an alternative upstream band is tested, as described in step 412 of FIG. 4. Data for determining whether the alternative band being used on port U10 (logical receiver L1) by the selected modem is better is obtained during this time. As mentioned, a time slot 714 is represented by lines 716 and 718. During this time slot, a first test period 716 is used to allow all modems on port U0 to transmit data upstream. Data on the signal transmission is collected for the present frequency at the headend. The selected modem is not allowed to transmit data during this time since the actual physical receiver is acting as logical receiver L0 on port U0. A second test period 718 in time slot 714 allows for the reverse: the physical receiver acts as L1 on port U10 thereby allowing the selected modem to transmit data upstream while the other modems are not allowed to send data. Test period 718 reflects time slots 512' and 514' in graph 518 of FIG. 5B. Data on the signal transmission quality of the alternative frequency on logical receiver L1 is gathered at or around this time. After time slot 714, the CMTS can determine which frequency to use.

Assuming the signal transmission on the alternative band is better, at a step 612 a UCC command is sent to the selected modem instructing it to return to physical port U0 and UCD and MAP messages for port U10 are discontinued. This step is also described in step 414 of FIG. 4. These particular steps would also occur if the alternative frequency is determined to be inferior to the present frequency. However, at a step 614, because the frequency on logical receiver L1 on port U10 is determined to be better, the UCD of port U0 is changed to match the UCD of port U10. The parameters of the two receivers are merged. Thus, all the modems, including the selected modem, now use the alternative frequency that was tested at step 610 and use physical port U0 and logical receiver L0. At this stage one complete cycle or iteration of the virtual upstream lookahead procedure is complete. The process of finding better bands using the virtual lookahead receiver can keep reiterating as desired by the network administrator. Computer programming instructions for implementing the band switching process described in FIG. 6 can be contained on a computer-readable medium, such as a CD-ROM, ASIC chip, or any other appropriate medium readable by the headend.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, while the process have been described for one physical upstream receiver performing as two logical receivers, any number of physical receivers can perform as any number of logical receivers as required by the network traffic, limited by characteristics of the cable plant including the CMTS. In another example, the concepts and techniques described can be used in standards other than the DOCSIS environment of the described embodiment. Accordingly, the present embodiments are to be considered as illustrative and not restrictive, and the invention is not to be limited to the details given herein, but may be modified within the scope and equivalents of the appended claims.

What is claimed is:

1. A method of using a physical upstream receiver, the method comprising:

in a normal mode, assigning a first set of parameters to the physical receiver for communicating with cable modems in a first frequency;

in a lookahead mode, assigning a second set of parameters to the physical upstream receiver for communicating with a device in a second frequency, the second frequency being different from the first frequency;

determining whether the second frequency should be used to communicate with the cable modems; and performing transitions between the normal mode and the lookahead mode periodically.

2. The method of claim 1, wherein the normal mode and the lookahead mode are performed alternately.

3. The method of claim 2, wherein the lookahead mode is performed multiple times during operation in the normal mode, and wherein each time the lookahead mode is performed, the physical ups receiver communicates with the device in a different frequency.

4. The method of claim 3, wherein the device is selected from the cable modems, the selected cable modem being inactive or not communicating.

5. The method of claim 4, further comprising identifying the selected modem by a MAC address or SID.

6. The method of claim 4, wherein the lookahead mode is performed for a short period of time such that the lookahead mode does not substantially interrupt communication of the cable modems.

7. The method of claim 6, wherein the physical upstream receiver receives data regarding the quality of the second frequency from the device during the lookahead mode.

8. The method of claim 1, wherein assigning the second set of parameters includes gig the physical upstream receiver a port number in the CMTS that is different from a port number for the normal mode.

9. The method of claim 1, wherein determining whether the second frequency should be used includes comparing the quality of the second frequency with a threshold signal quality.

10. The method of claim 1, further comprising assigning the second set of parameters to the physical upstream receiver for communicating with the cable modems if the second frequency is determined to be used to communicate with the cable modems.

11. The method of claim 1, wherein the first and second sets of parameters include at least one of frequency center, channel width, and modulation format.

12. The method of claim 1, further comprising sending a fit upstream channel change (UCC) command to the device instructing the device to use a new port in place of a present port.

13. The method of claim 12, further comprising sending a second UCC command to the device instructing the device to return to the present port.

14. The method of claim 1, further comprising sending an upstream channel descriptor (UCD) message to the device.

15. A physical upstream receiver comprising:

one or more processors; and memory in communication with at least one of the one or more processors, wherein at least one of the one or more processors is configured to in a normal mode, communicate with cable modems in a first frequency using a first set of parameters, in a lookahead mode, communicate with a device in a second frequency using a second set of parameters, the second frequency being different from the first frequency, determine whether the second frequency should be used to communicate with the cable modems, and perform transitions between the normal mode and the lookahead mode periodically.

16. The physical upstream receiver of claim 15, wherein the physical upstream receiver is configured through MAC instructions to perform the normal mode and the lookahead mode.

17. The physical upstream receiver of claim 16, wherein the MAC instructions include an upstream channel change message and an upstream channel descriptor message.

18. The physical upstream receiver of claim 15, wherein the normal mode and the lookahead mode are performed alternately.

19. The physical upstream receiver of claim 15, wherein when the lookahead mode is entered, the second frequency is changed to a different frequency if the second frequency is determined not to be used to communicate with the cable modems.

20. The physical upstream receiver of claim 15, wherein the device is selected from the cable modems the selected cable modem being inactive or not communicating.

21. A physical upstream receiver comprising:

means for, in a normal mode, communicating with cable modems in a first frequency using a first set of parameters;

means for, in a lookahead mode, communicating with a device in a second frequency using a second set of parameters, the second frequency being different from the first frequency;

means for determining whether the second frequency should be used to communicate with the cable modems; and means for perform transitions between the normal mode and the lookahead mode periodically.

22. The physical upstream receiver of claim 21, wherein the physical upstream receiver is configured through MAC instructions to perform the normal mode and the lookahead mode.

23. The physical upstream receiver of claim 22, wherein the MAC instructions include an upstream channel change message and an upstream channel descriptor message.

24. The physical upstream receiver of claim 21, wherein the normal mode and the lookahead mode are performed alternately.

25. The physical upstream receiver of claim 21, wherein when the lookahead mode is entered, the second frequency is changed to a different frequency if the second frequency is determined not to be used to communicate with the cable modems.

26. The physical upstream receiver of claim 21, wherein the device is selected from the cable modems, the selected cable modem beg inactive or not communicating.

27. A computer readable medium on which is provided a computer code for using a physical upstream receiver, the computer code comprising instructions for:

in a normal mode, assigning a first set of parameters to the physical upstream receiver for communicating with cable modems in a first frequency;

in a lookahead mode, assigning a second set of parameters to the physical upstream receiver for communicating with a device in a second frequency, the second frequency being different from the first frequency;

determining whether the second frequency should be used to communicate with the cable modems;

performing between the normal mode and the lookahead mode periodically.

28. The computer readable medium of claim 27, wherein the normal mode and the lookahead mode are performed alternately.

29. The computer readable medium of claim 28, wherein when the lookahead mode is entered, the second frequency is changed to a different frequency if the second frequency is determined not to be used to communicate with the cable modems.

30. The computer readable medium of claim 29, wherein the device is selected from the cable modems, the selected cable modem being inactive or not communicating.

* * * * *